United States Patent
Kobayashi

(10) Patent No.: US 9,896,125 B2
(45) Date of Patent: Feb. 20, 2018

(54) CONTROL APPARATUS AND CONTROL METHOD OF ON-VEHICLE ELECTRONIC EQUIPMENT

(71) Applicant: NSK LTD., Tokyo (JP)

(72) Inventor: Toshihiko Kobayashi, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/039,469

(22) PCT Filed: Sep. 25, 2014

(86) PCT No.: PCT/JP2014/075394
§ 371 (c)(1),
(2) Date: May 26, 2016

(87) PCT Pub. No.: WO2016/046930
PCT Pub. Date: Mar. 31, 2016

(65) Prior Publication Data
US 2017/0190357 A1 Jul. 6, 2017

(51) Int. Cl.
*B62D 6/10* (2006.01)
*B62D 5/04* (2006.01)
*G06F 9/48* (2006.01)

(52) U.S. Cl.
CPC .............. *B62D 6/10* (2013.01); *B62D 5/0412* (2013.01); *B62D 5/0463* (2013.01); *G06F 9/4887* (2013.01)

(58) Field of Classification Search
CPC ...... B62D 6/10; B62D 5/0412; B62D 5/0463; G06F 9/4887
See application file for complete search history.

(56) References Cited

U.S. PATENT DOCUMENTS

| 6,430,594 B1 * | 8/2002 | Akiyama | ................ G06F 9/461 718/102 |
| 2005/0235085 A1 * | 10/2005 | Ichinose | ............... G06F 9/4812 710/200 |
| 2009/0254773 A1 | 10/2009 | Weiberle et al. | |

FOREIGN PATENT DOCUMENTS

| JP | 06-324914 A | 11/1994 |
| JP | 10-198584 A | 7/1998 |
| JP | 2006-090356 A | 4/2006 |

(Continued)

OTHER PUBLICATIONS

International Preliminary Report on Patentability of PCT/JP2015/066239 dated Dec. 7, 2015.

(Continued)

*Primary Examiner* — Aaron L Troost
(74) *Attorney, Agent, or Firm* — Sughrue Mion, PLLC

(57) ABSTRACT

A control apparatus of an on-vehicle electronic equipment. The control apparatus of the on-vehicle electronic equipment monitors an execution time of each normal processing obtained by subdividing a control program of the on-vehicle electronic equipment by means of an MCU which is provided in the control apparatus. In a case that an abnormality in the execution time of the normal processing is detected by a timer interruption processing based on a general-purpose timer built in the MCU and software, an alternative processing to be paired with the normal processing is performed to continue a control of the on-vehicle electronic equipment by replacing the normal processing with the alternative processing in a next period.

4 Claims, 13 Drawing Sheets

(56) References Cited

FOREIGN PATENT DOCUMENTS

| JP | 2006-248462 A | 9/2006 |
| JP | 2008-072822 A | 3/2008 |
| JP | 2008-518293 A | 5/2008 |
| JP | 2009-113618 A | 5/2009 |

OTHER PUBLICATIONS

International Search Report of PCT/JP2014/075394 dated Dec. 22, 2014.

* cited by examiner

FIG.4

| EXECUTION SEQUENCE | NORMAL PROCESSING | NORMAL PROCESSING'S EXECUTION TIME THRESHOLD | ALTERNATIVE PROCESSING | ALTERNATIVEL PROCESSING'S EXECUTION TIME THRESHOLD |
|---|---|---|---|---|
| 1 | PROCESSING 1 | 70「μs」 | ALTERNATIVE PROCESSING FOR PROCESSING 1 | 35「μs」 |
| 2 | PROCESSING 2 | 120「μs」 | ALTERNATIVE PROCESSING FOR PROCESSING 2 | 60「μs」 |
| 3 | PROCESSING 3 | 200「μs」 | ALTERNATIVE PROCESSING FOR PROCESSING 3 | 100「μs」 |
| 4 | PROCESSING 4 | 120「μs」 | ALTERNATIVE PROCESSING FOR PROCESSING 4 | 60「μs」 |
| 5 | PROCESSING 5 | 100「μs」 | ALTERNATIVE PROCESSING FOR PROCESSING 5 | 50「μs」 |
| 6 | PROCESSING 6 | 20「μs」 | ALTERNATIVE PROCESSING FOR PROCESSING 6 | 10「μs」 |
| 7 | PROCESSING 7 | 30「μs」 | ALTERNATIVE PROCESSING FOR PROCESSING 7 | 15「μs」 |
| 8 | PROCESSING 8 | 300「μs」 | ALTERNATIVE PROCESSING FOR PROCESSING 8 | 150「μs」 |
| 9 | PROCESSING 9 | 50「μs」 | ALTERNATIVE PROCESSING FOR PROCESSING 9 | 25「μs」 |
| 10 | PROCESSING 10 | 10「μs」 | ALTERNATIVE PROCESSING FOR PROCESSING 10 | 5「μs」 |
| . | . | . | . | . |
| . | . | . | . | . |
| . | . | . | . | . |
| N | PROCESSING N | 50「μs」 | ALTERNATIVE PROCESSING FOR PROCESSING N | 25「μs」 |

FIG.5

EXECUTION SEQUENCE WHEN EXECUTION TIME IS NORMAL

| EXECUTION SEQUENCE | NORMAL PROCESSING |
|---|---|
| 1 | PROCESSING 1 |
| 2 | PROCESSING 2 |
| 3 | PROCESSING 3 |
| 4 | PROCESSING 4 |
| 5 | PROCESSING 5 |
| 6 | PROCESSING 6 |
| 7 | PROCESSING 7 |
| 8 | PROCESSING 8 |
| 9 | PROCESSING 9 |
| 10 | PROCESSING 10 |
| . | . |
| . | . |
| N | PROCESSING N |

EXECUTION SEQUENCE IN THE NEXT PERIOD WHEN EXECUTION TIME (EXECUTION TIME OF PROCESSING 2) IS ABNORMAL

| EXECUTION SEQUENCE | NORMAL PROCESSING |
|---|---|
| 1 | PROCESSING 1 |
| 2 | ALTERNATIVE PROCESSING FOR PROCESSING 2 |
| 3 | PROCESSING 3 |
| 4 | PROCESSING 4 |
| 5 | PROCESSING 5 |
| 6 | PROCESSING 6 |
| 7 | PROCESSING 7 |
| 8 | PROCESSING 8 |
| 9 | PROCESSING 9 |
| 10 | PROCESSING 10 |
| . | . |
| . | . |
| N | PROCESSING N |

CONTROL APPARATUS AND CONTROL METHOD OF ON-VEHICLE ELECTRONIC EQUIPMENT

CROSS REFERENCE TO RELATED APPLICATIONS

This is a National Stage of International Application No. PCT/JP2014/075394 filed Sep. 25, 2014, the contents of which are incorporated herein by reference in its entirety.

TECHNICAL FIELD

The present invention relates to a control apparatus and a control method of on-vehicle electronic equipment, and in particular to a control apparatus and a control method of on-vehicle electronic equipment that monitor execution time of a control program for controlling the above on-vehicle electronic equipment by a shorter time unit than conventional abnormality monitoring using a watchdog timer, and in the case that an execution time abnormality of a processing obtained by subdividing the control program is detected, continue a control of the on-vehicle electronic equipment by replacing the above processing with a simple alternative processing in the next period.

BACKGROUND ART

Recently, computerization of vehicles has been progressing, various equipments, driving systems, auxiliary systems for the same, etc. of the vehicle are equipped with a number of electronic equipments, and these electronic equipments are controlled. Further, in a control apparatus for controlling such an on-vehicle electronic equipment, in order to realize a safe operation of the vehicle and improve the convenience and comfortability of drivers, a high safety and a high reliability are required.

Therefore, in the control apparatus of the on-vehicle electronic equipment described above, in order to ensure the high safety and the high reliability, abnormality monitoring of a control program for controlling the electronic equipment is performed. Conventionally, in the control apparatus of the on-vehicle electronic equipment, a method that performs abnormality monitoring (abnormality detecting) by using a watchdog timer (WDT) is commonly known as a method for monitoring (detecting) abnormality of the control program.

In the conventional control program abnormality monitoring using the WDT, in the case that no abnormality occurs in the control program, the WDT is constantly cleared by a clear command within a prescribed time (before the time of the WDT is up), and counting of the WDT is restarted. On the other hand, in the case that an abnormality occurs in the control program, since the clear command is not executed, the time of the WDT is up, as a result, reset is executed, and it is possible for an abnormal execution state of the control program not to continue over a prescribed time.

For example, in the case that the above electronic equipment is an electric power steering apparatus, as described in Patent Document 1 (Japanese Published Unexamined Patent Application No. 2009-113618 A), a technique that accurately detects the abnormal execution state of the control program being undetectable by means of the WDT described above and by measuring a termination time of each task and performing detection of the abnormal execution state of the control program based on the measured termination time of each task by means of a control section, is disclosed.

Further, in Patent Document 2 (Japanese Published Unexamined Patent Application No. 2006-90356 A), a technique that suppresses the occurrence of faults such as task missing and so on by detecting a task with a high processing load in a control apparatus for vehicle control and replacing with processing contents with a lower processing load based on a predetermined task congestion criterion, is disclosed.

THE LIST OF PRIOR ART DOCUMENTS

Patent Documents

Patent Document 1: Japanese Published Unexamined Patent Application No. 2009-113618 A
Patent Document 2: Japanese Published Unexamined Patent Application No. 2006-90356 A

SUMMARY OF THE INVENTION

Problems to be Solved by the Invention

However, in a conventional invention described in the Patent Document 1, although the abnormality detecting of the control program is performed by performing an interruption, in the case that the abnormal execution state of the control program is detected, since only an abnormality processing such as resetting of the control program is performed, there is a problem that a steering assist by the electric power steering apparatus stops and burdens on a driver increase.

Further, in a conventional invention described in the Patent Document 2, although a task processing is performed after reducing a processing load by partly simplifying processing contents of a task with a high processing load, there is a problem that it is impossible to detect the abnormality of the task processing in the case that the task processing itself is not terminated.

The present invention has been developed in view of the above-described circumstances, and the object of the present invention is to provide a control apparatus and a control method of on-vehicle electronic equipment that monitor execution time of a control program of the on-vehicle electronic equipment by a shorter time unit, and in the case that an execution time abnormality of a processing obtained by subdividing the control program is detected, continue a control processing of the on-vehicle electronic equipment by replacing the above processing with a simple alternative processing in the next period.

Means for Solving the Problems

The present invention relates to a control apparatus of on-vehicle electronic equipment, the above-described object of the present invention is achieved by that monitors an execution time of each normal processing obtained by subdividing a control program of said on-vehicle electronic equipment by means of an MCU which is provided in said control apparatus, wherein in a case that an abnormality in said execution time of said normal processing is detected by a timer interruption processing based on a general-purpose timer built in said MCU and software, an alternative processing to be paired with said normal processing is performed to continue a control of said on-vehicle electronic equipment by replacing said normal processing with said alternative processing in a next period.

Further, the above-described object of the present invention is more effectively achieved by that wherein said execution time of said normal processing is measured by means of said general-purpose timer, wherein with respect to said normal processing, execution time thresholds for execution time monitoring are set respectively, and concurrently with respect to said alternative processing, execution time thresholds for execution time monitoring are set respectively; or wherein said MCU performs monitoring of said execution time of said normal processing by using said general-purpose timer and an interruption based on said general-purpose timer, and sets a timer interruption time based on said execution time threshold of said normal processing; or wherein said on-vehicle electronic equipment is an electric power steering apparatus.

Further, the present invention relates to a control method of on-vehicle electronic equipment, the above-described object of the present invention is achieved by that monitors an execution time of each normal processing obtained by subdividing a control program of said on-vehicle electronic equipment by means of an MCU which is provided in a control apparatus of said on-vehicle electronic equipment, and in a case that an abnormality in said execution time of said normal processing is detected by a timer interruption processing based on a general-purpose timer built in said MCU and software, performs an alternative processing to be paired with said normal processing to continue a control of said on-vehicle electronic equipment by replacing said normal processing with said alternative processing in a next period.

Further, the above-described object of the present invention is more effectively achieved by that wherein said execution time of said normal processing is measured by means of said general-purpose timer, wherein with respect to said normal processing, execution time thresholds for execution time monitoring are set respectively, and concurrently with respect to said alternative processing, execution time thresholds for execution time monitoring are set respectively; or wherein said MCU performs monitoring of said execution time of said normal processing by using said general-purpose timer and an interruption based on said general-purpose timer, and sets a timer interruption time based on said execution time threshold of said normal processing; or wherein said on-vehicle electronic equipment is an electric power steering apparatus.

Effects of the Invention

According to a control apparatus and a control method of on-vehicle electronic equipment of the present invention, since monitoring execution state (execution time) of a control program of the on-vehicle electronic equipment by a shorter time unit (i.e., by an execution time threshold unit of a normal processing obtained by subdividing the control program of the on-vehicle electronic equipment), in comparison with the case of monitoring by the conventional abnormality monitoring using a watchdog timer, it is possible to quickly detect an abnormal execution time (an abnormal execution state) of the normal processing.

Further, according to the present invention, since performing the execution time monitoring of the normal processing by means of a general-purpose timer within a micro control unit (MCU) which is provided in a control unit for controlling the on-vehicle electronic equipment and setting a timer interruption time based on the execution time threshold of the above normal processing, as a result, it is not necessary to wait for the termination of the normal processing, and it is possible to immediately detect the abnormality of the execution time (the execution state) of the above normal processing.

Accordingly, for example, when the control apparatus and the control method of on-vehicle electronic equipment of the present invention is used in the control of an electric power steering apparatus, even in the case of judging that an abnormality occurs in a control apparatus of the electric power steering apparatus, since it is possible to continue a control processing of the electric power steering apparatus by replacing the processing that the execution time abnormality is detected with a simple alternative processing in the next period, it becomes possible to continuously perform the steering assist by the electric power steering apparatus, and it is also possible to realize a comfortable steering performance without giving excessive burdens to the driver.

BRIEF DESCRIPTION OF THE DRAWINGS

In the accompanying drawings:

FIG. 4 is a diagram showing a setting example used in the present invention of each processing (normal processing) obtained by subdividing a control program and execution time threshold of each processing, and each alternative processing corresponding to each processing and execution time threshold of each alternative processing;

FIG. 5 is a diagram for explaining an execution sequence of the normal processing in the case that there is no abnormality in the execution time of processing 2 as a normal processing (when the execution time is normal) and an execution sequence of the normal processing in the next period in the case that the execution time abnormality of processing 2 as a normal processing is detected (when the execution time is abnormal) in the present invention;

MODE FOR CARRYING OUT THE INVENTION

Hereinafter, with respect to embodiments of the present invention, as a concrete example, a practical example that a control apparatus and a control method of on-vehicle electronic equipment of the present invention are used in an electric power steering apparatus being an on-vehicle electronic equipment will be described.

Here, the electric power steering apparatus provides a steering mechanism of a vehicle with a steering assist torque (an assist torque) by means of a rotational torque of a motor, and applies a driving force of the motor as the assist torque to a steering shaft or a rack shaft by means of a transmission mechanism such as gears or a belt through a reduction mechanism. Further, in order to accurately generate the steering assist torque, such an electric power steering apparatus (EPS) performs a feedback control of a motor current. Such feedback control adjusts a voltage supplied to the motor so that a difference between a steering assist command value (a current command value) and a detected motor current value becomes small, and the adjustment of the voltage applied to the motor is generally performed by an adjustment of duty of a pulse width modulation (PWM) control.

Figure 1:
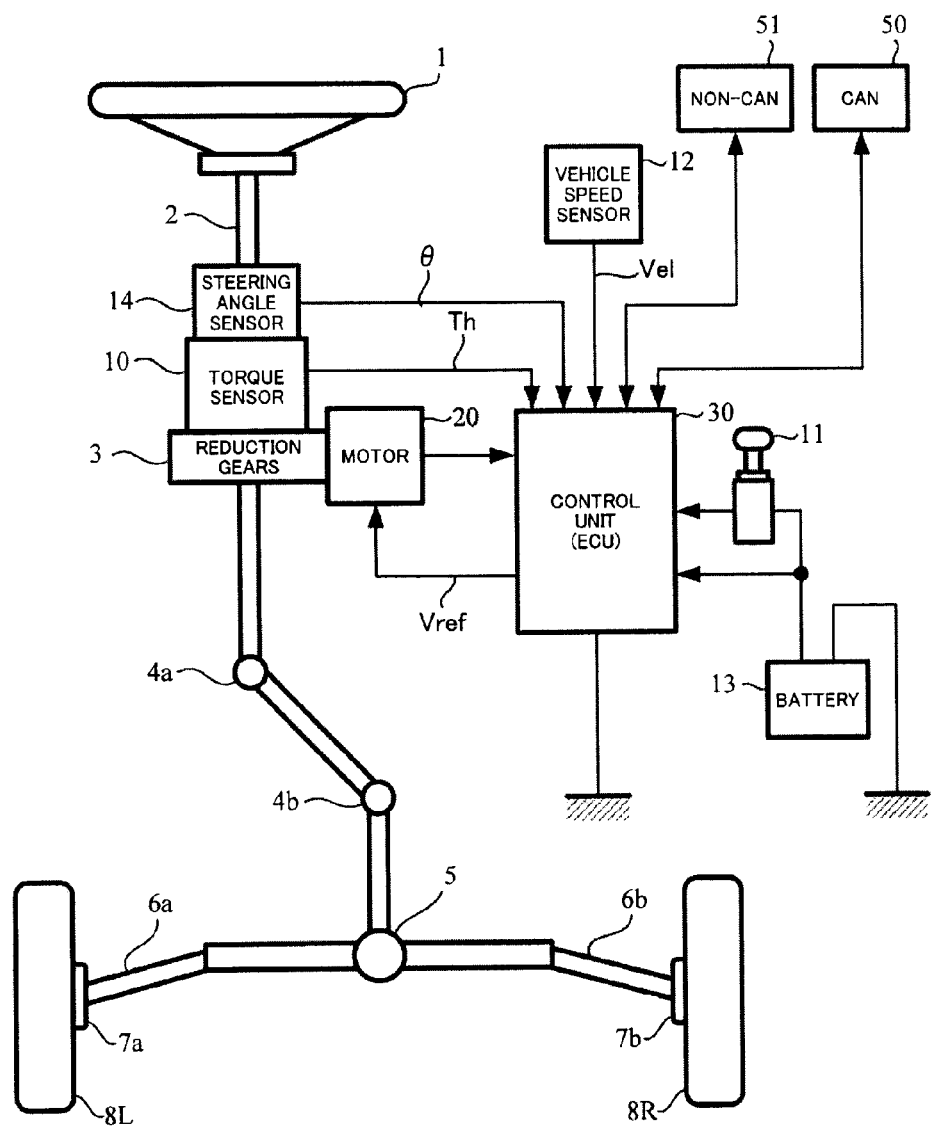
FIG. 1 is a diagram illustrating a general configuration of an electric power steering apparatus.

A general configuration of the electric power steering apparatus will be described with reference to FIG. 1. As shown in FIG. 1, a column shaft (a steering shaft, a handle shaft) 2 connected to a steering wheel (a handle) 1, is connected to steered wheels 8L and 8R through reduction gears 3 as a reduction mechanism, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1 and a steering angle sensor 14 for detecting a steering angle θ, and a motor 20 for assisting the steering force of the steering wheel 1 is connected to the column shaft 2 through the reduction gears 3 (gear ratio "n") as the reduction mechanism.

Furthermore, a control unit (ECU) 30 for controlling the electric power steering apparatus is configured to use a micro control unit (MCU) 31 as its key component, electric power is supplied to the control unit 30 from a battery 13, and an ignition key signal is inputted into the control unit 30 through an ignition key 11.

The control unit (ECU) 30 having such configuration calculates a current command value of an assist (steering assist) command based on a steering torque Th detected by the torque sensor 10 and a vehicle speed Vel detected by a vehicle speed sensor 12, and controls a current supplied to the motor 20 based on a voltage control command value Vref obtained by performing compensation and so on with respect to the current command value. In addition, the steering angle sensor 14 is not a necessary element, it is also possible not to be provided with the steering angle sensor 14, and it is also possible to obtain a steering angle from a rotation position sensor such as a resolver connected to the motor 20.

Moreover, a controller area network (CAN) 50 for transmitting and receiving various kinds of information of the vehicle is connected to the control unit (ECU) 30, and it is also possible to receive the vehicle speed Vel from the CAN 50. Further, a non-CAN 51 for transmitting and receiving communications, analog/digital signals, electric waves and so on except the CAN 50, is also connected to the control unit (ECU) 30.

Figure 2:
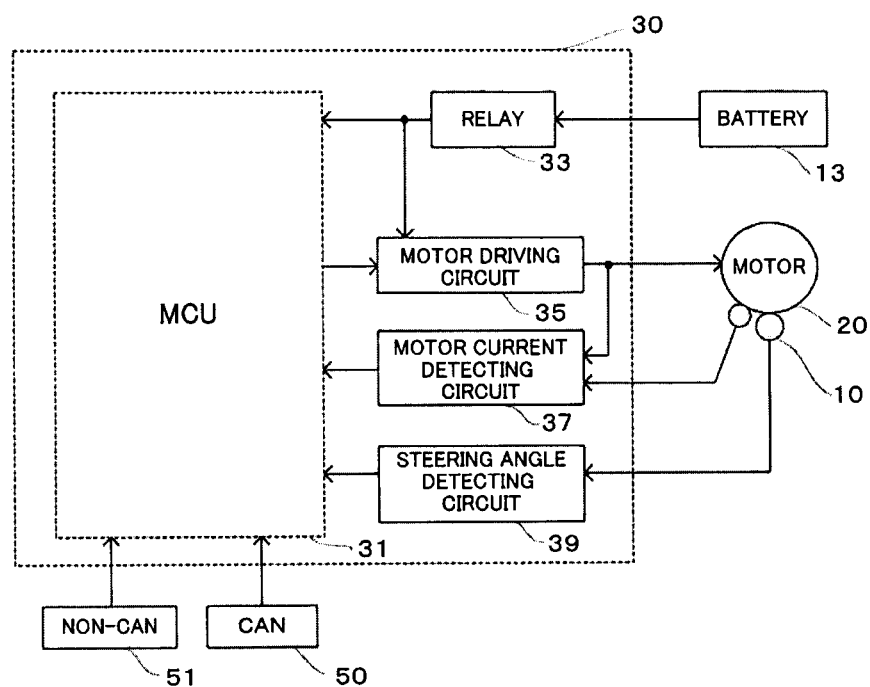
FIG. 2 is a diagram showing a basic configuration example of a control unit (ECU)

The control unit (ECU) 30 basically has a basic configuration shown in FIG. 2, and comprises the micro control unit (MCU) 31 equipped with a central processing unit (CPU), a motor driving circuit 35, a motor current detecting circuit 37, a steering angle detecting circuit 39, a relay 33 of a power supply and so on.

Figure 3:
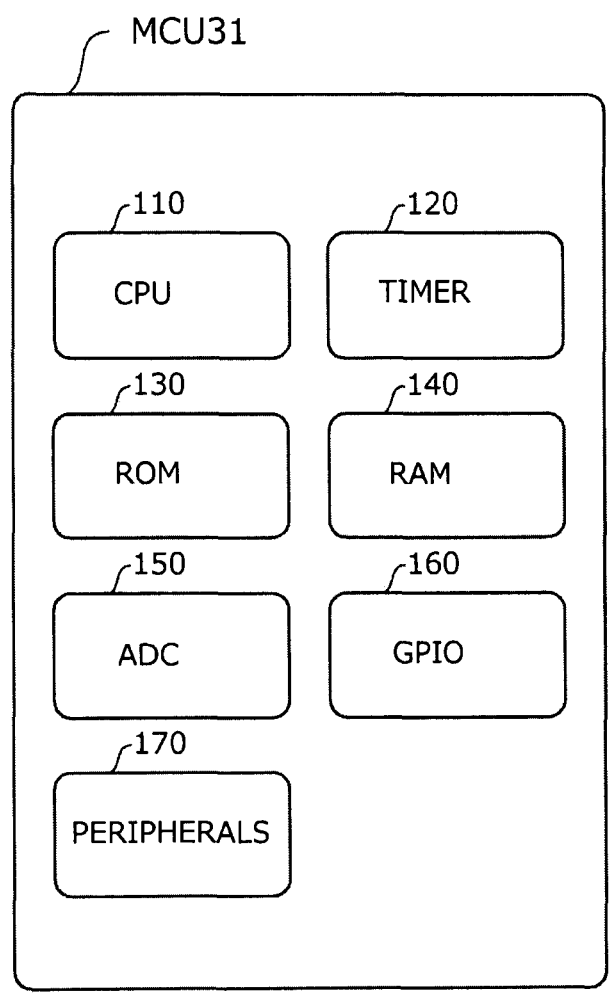
FIG. 3 is a diagram showing a schematic configuration of a micro control unit (MCU) used in the present invention.

In the present invention, for example, a built-in microcomputer is used as the micro control unit (MCU) 31. FIG. 3 shows a schematic configuration of the MCU 31, the inside of the MCU 31 comprises a CPU 110, a general-purpose timer (timer) 120, a ROM (including an EEPROM or the like) 130, a RAM 140, an analog/digital converter (ADC) 150, a general-purpose I/O (GPIO) 160 and peripherals 170, and these are bus-connected by data buses, address buses and control buses.

In the present invention, a control program of the electric power steering apparatus being comprised of a plurality of processes (also including each normal processing obtained by subdividing the control program to be described below and each alternative processing to be paired with each normal processing), control data, etc. are stored in the ROM 130, the CPU 110 performs the control of the electric power steering apparatus by periodically executing the above each normal processing and the above each alternative processing (when the alternative processing becomes necessary) based on an execution sequence, and the RAM 140 functions also as a work memory when the CPU 110 is operating.

"The plurality of processes" referred to in the present invention means a plurality of control procedures that configure the control program of the electric power steering apparatus, for example, includes a torque control process for calculating a steering assist torque command value based on a steering torque T and a vehicle speed V, a current control process for driving a steering assist motor 20 based on the steering assist torque command value, and other processes. Further, in the present invention, the control program is periodically executed.

In the present invention, the control program of the electric power steering apparatus is subdivided into a plurality of normal processings (for example, processings 1 to N shown in FIG. 4) for every execution sequence, and the subdivided plurality of normal processings (for example, processings 1 to N shown in FIG. 4) are periodically performed. With respect to each normal processing obtained by subdividing the control program (hereinafter, also simply referred to as "each normal processing"), execution time thresholds for execution time monitoring (for example, normal processing's execution time thresholds corresponding to processings 1 to N shown in FIG. 4) are set respectively.

Further, in the present invention, with respect to each processing, alternative processings (for example, as shown in FIG. 4, an alternative processing for processing 1 to an alternative processing for processing N) are set respectively, and concurrently, with respect to each alternative processing, execution time thresholds for execution time monitoring (for example, as shown in FIG. 4, alternative processing's execution time thresholds corresponding to the alternative processing for processing 1 to the alternative processing for processing N) are set respectively.

Moreover, in the present invention, each processing obtained by subdividing the control program of the electric power steering apparatus and each alternative processing to be paired with each processing are stored in the ROM 130 within the MCU 31 in which the control program of the electric power steering apparatus is stored.

Furthermore, in a setting example shown in FIG. 4, although each normal processing (processings 1 to N) is obtained by subdividing the control program of the electric power steering apparatus for every execution sequence, in the present invention, the method for subdividing the control program is not limited to this subdividing method used in the setting example of FIG. 4, it is possible to use other subdividing methods, for example, it is also possible to subdivide the control program of the electric power steering apparatus based on function tables relating to the control of the electric power steering apparatus.

In the present invention, the execution time and the execution sequence of each normal processing obtained by subdividing the control program are monitored by means of the CPU 110 and the general-purpose timer (timer) 120. The present invention periodically executes the plurality of normal processings obtained by subdividing the control program (processings 1 to N) while monitoring the execution time and the execution sequence of the plurality of normal processings. With respect to each normal processing, as shown in FIG. 4, in the case that the execution time abnormality of the normal processing is detected (when the execution time of the normal processing is abnormal), as a substitute for the normal processing, an alternative processing executed in the next period is provided.

For example, as shown in FIG. 4, setting conditions such as each processing obtained by subdividing the control program of the electric power steering apparatus (processings 1 to N), the execution sequence of each processing (1 to N), the execution time threshold of each processing, each alternative processing corresponding to each processing (the alternative processing for processing 1 to the alternative processing for processing N), and the execution time threshold of each alternative processing are stored in the ROM 130 or the RAM 140. Further, although not shown in the figure, both head addresses of each processing as the processing address of the normal processing (a head address of processing 1 to a head address of processing N) and head addresses of each alternative processing as the processing address of the alternative processing (a head address of the alternative processing for processing 1 to a head address of the alternative processing for processing N) are stored in the ROM 130 or the RAM 140.

Moreover, in FIG. 4, although alternative processing's execution time thresholds in the case of performing each alternative processing on behalf of each processing are set to half of normal processing's execution time threshold of each processing performed at the time of a normal situation, setting values of the normal processing's execution time threshold and setting values of the alternative processing's execution time threshold that are shown in FIG. 4 are one example of the execution time threshold of each normal processing and the execution time threshold of each alternative processing that are used in the present invention, the execution time threshold of each normal processing and the execution time threshold of each alternative processing in the present invention are not limited to these setting values. In the present invention, it is possible to appropriately set the alternative processing's execution time threshold based on processing contents of the normal processing and the alternative processing so as to make the alternative processing's execution time threshold smaller than corresponding normal processing's execution time threshold.

Figure 6:
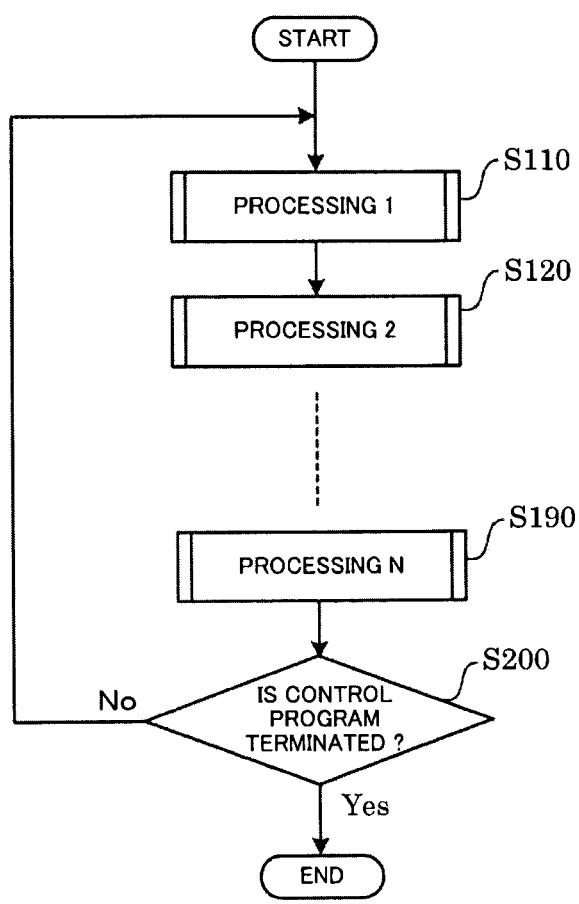
FIG. 6 is a flowchart of the control program when the execution time of the normal processing is normal in the present invention.
Figure 7:
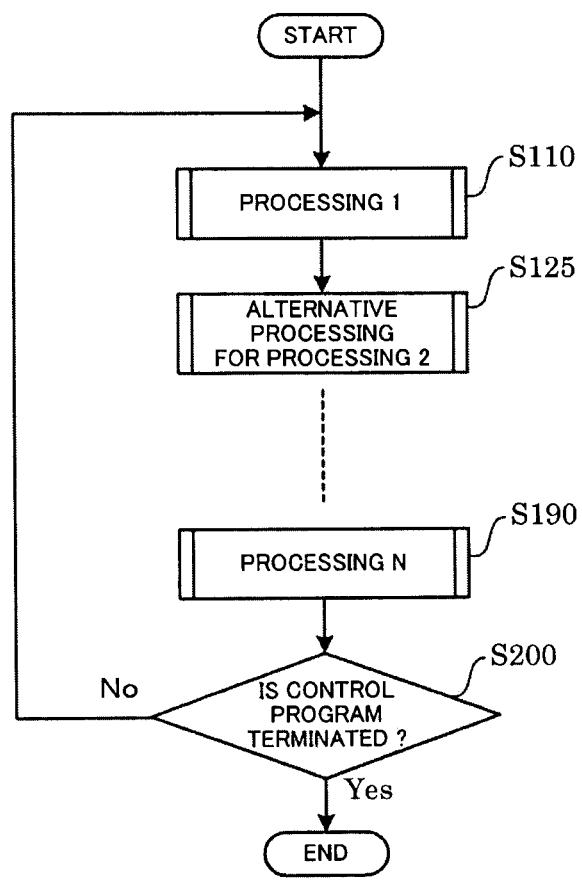
FIG. 7 is a flowchart in the next period of the control program when the execution time of the normal processing is abnormal in the present invention.
Figure 8:
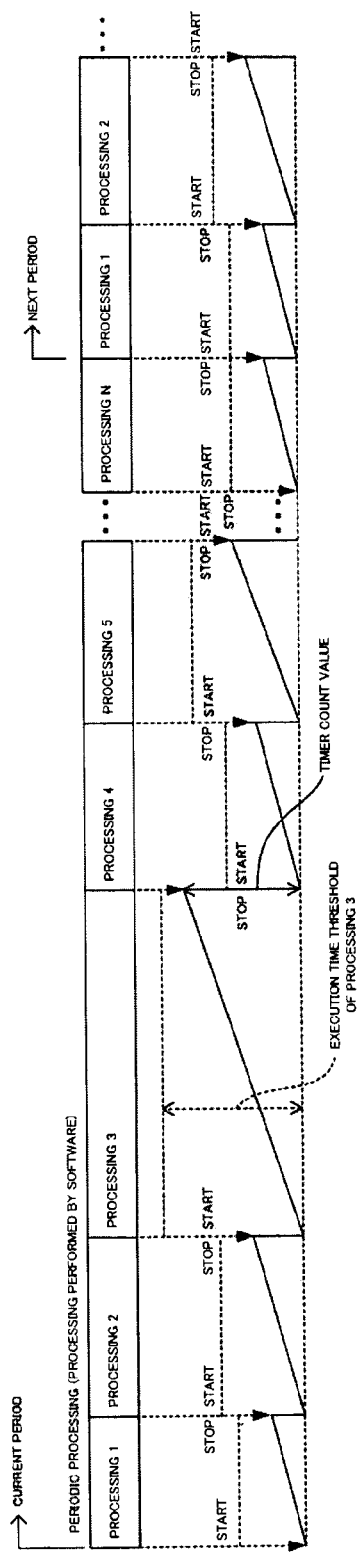
FIG. 8 is a diagram for explaining a periodic processing when the execution time of the normal processing is normal in the present invention.
Figure 9:
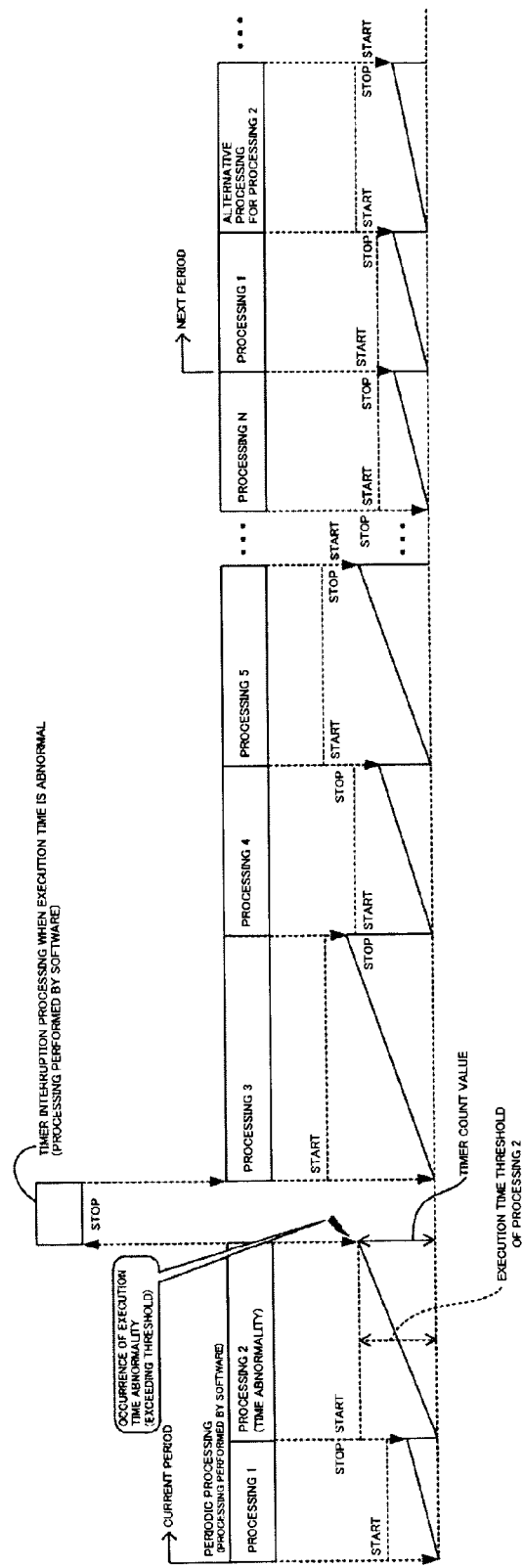
FIG. 9 is a diagram for explaining a periodic processing when the execution time of the normal processing is abnormal in the present invention.

FIG. 5 is a diagram for explaining the execution sequence of the normal processing in the case that there is no abnormality in the execution time of the processing 2 as a normal processing (when the execution time is normal) and the execution sequence of the normal processing in the next period in the case that the execution time abnormality of the processing 2 as a normal processing is detected (when the execution time is abnormal) in the present invention. FIG. 6 is a flowchart of the control program when the execution time of the normal processing is normal in the present invention. FIG. 7 is a flowchart in the next period of the control program when the execution time of the normal processing is abnormal in the present invention. Further, FIG. 8 is a diagram for explaining the periodic processing when the execution time of the normal processing is normal in the present invention. FIG. 9 is a diagram for explaining the periodic processing when the execution time of the normal processing is abnormal in the present invention.

In order to perform the control of the electric power steering apparatus, in the present invention, the CPU 110 periodically executes the plurality of normal processings (for example, processings 1 to N shown in FIG. 4) obtained by subdividing the control program. The flow of the processings performed by the CPU 110 will be described with reference to FIG. 5 to FIG. 9.

The flow of the control program in the case that the execution times of all normal processings (for example, processings 1 to N shown in FIG. 4) are normal, is shown in FIG. 6. As shown in FIG. 6, the CPU 110 judges whether the control program is terminated or not (step S200) after sequentially executing the processing 1, the processing 2, . . . , the processing N based on the execution sequence when the execution time is normal shown in FIG. 5 (step S110, step S120, . . . , step S190), in the case that the control program is not terminated, returns to step S110 to continue the periodic processing based on the execution sequence when the execution time is normal, and on the other hand, in the case that the control program is terminated, ends the processing.

On the other hand, for example, in the case that the execution time of a normal processing being performed based on the execution sequence (the processing time of the said normal processing) exceeds the execution time threshold of the said normal processing for some reasons, the present invention regards the normal processing itself as abnormality, in the current period, stops the normal processing by performing a timer interruption processing, and performs the next normal processing based on the execution sequence after going through the interruption, and in the next period, as a substitute for the said normal processing, executes an alternative processing corresponding to the said normal processing based on the execution sequence of the said normal processing. Further, "the timer interruption processing" referred to in the present invention means a software processing performed by the MCU 31. The flow of the control program in the next period in the case that for example the execution time abnormality of the processing 2 is detected (when the execution time of the processing 2 is abnormal) is shown in FIG. 7. As shown in FIG. 7, the CPU 110 judges whether the control program is terminated or not (step S200) after sequentially executing the processing 1, an alternative processing for processing 2, . . . , the processing N based on the execution sequence in the next period when the execution time is abnormal shown in FIG. 5 (step S110, step S125, . . . , step S190), in the case that the control program is not terminated, returns to step S110 to continue the periodic processing based on the execution sequence when the execution time is normal, and on the other hand, in the case that the control program is terminated, ends the processing.

Here, a measurement method using the general-purpose timer 120 built in the MCU 31 (hereinafter, also simply referred to as "a timer") for measuring the execution time of the normal processing in the present invention will be described. As shown in FIG. 8, the present invention starts the timer at the head (beginning) of each normal processing and stops the timer at the end of each normal processing. When the timer is stopped at the end of each normal processing, a timer count value is cleared to zero. In the present invention, a start processing and a stop processing of the timer are software processings performed by the MCU 31 (i.e., software processings performed by the CPU 110).

Here, the measurement method for measuring the execution time of a processing M being a certain normal processing in the periodic processing (the processing M is any one processing of processings 1 to N) will be described. The timer is started at the beginning of the processing M, and then, when the timer count value reaches processing M's execution time threshold that is set in the timer at the beginning of the processing M, since the present invention judges that the execution time abnormality of the processing M occurs, "a comparison match interruption" occurs, in the current period, the abnormality processing (such as the timer interruption processing, a stop processing of the processing M and so on), and in the next period, an alternative processing corresponding to the processing M (an alternative processing for processing M) is performed. Further, since "the timer count value" referred to in the present invention means "the execution time of the normal processing" obtained based on a timer count value of the micro control unit (MCU) 31, hereinafter, "the timer count value" and "the execution time of the normal processing" are used in the same meaning.

FIG. 8 conceptually shows the periodic processing performed by software when the execution time of the normal processing is normal in the present invention. In FIG. 8, processings 1 to N configure one periodic processing. With respect to each normal processing (processings 1 to N), for example, as shown in FIG. 4, respective normal processing's execution time thresholds are set. As shown in FIG. 8, in the periodic processing of the current period, since the timer count value does not exceed the normal processing's execution time thresholds corresponding to all normal processings (processings 1 to N) at the end of these normal processings, the execution times of all normal processings (the execution times of processings 1 to N) are regarded as normal. In other words, in FIG. 8, in the current period, since each normal processing has already ended before respective timer count values reach the normal processing's execution time thresholds corresponding to these normal processings, it is judged that all the execution times of the normal processings of the current period are normal and all the execution states of the normal processings of the current period are normal.

FIG. 9 conceptually shows the periodic processing performed by software when the execution time of the normal processing (the execution time of the processing 2) is abnormal in the present invention. In FIG. 9, processings 1 to N configure one periodic processing. With respect to each normal processing (processings 1 to N), for example, as shown in FIG. 4, respective normal processing's execution time thresholds are set. As shown in FIG. 9, in the periodic processing of the current period, since the timer count value does not exceed the execution time threshold of the processing 1 at the end of the processing 1, the execution time of the processing 1 is regarded as normal, therefore, based on the execution sequence shown in FIG. 4, the CPU 110 performs the start processing of the timer and concurrently executes the processing 2, at the time when the timer count value (the execution time of the processing 2) reaches processing 2's execution time threshold that is set in the timer at the beginning of the processing 2, since the processing 2 is not terminated yet, it is judged that the execution time abnormality of the processing 2 occurs, the general-purpose timer 120 notifies the CPU 110 of an interruption, the timer interruption processing is performed, after performing a proper processing (for example, a stop processing of the processing 2) during the timer interruption processing, when going through the interruption, based on the execution sequence shown in FIG. 4, the CPU 110 performs the start processing of the timer and concurrently executes the next normal processing of the processing 2 (i.e., the processing 3). In the present invention, the timer interruption processing is a software processing performed by the MCU 31 (i.e., a software processing performed by the CPU 110). Here, the processing 2 that it is judged that the execution time abnormality occurs in the current period, is replaced in the next period with an alternative processing corresponding to the processing 2 (i.e., the alternative processing for processing 2). Furthermore, in FIG. 9, in the current period, all the execution times of processings 3 to N are normal.

Figure 10:
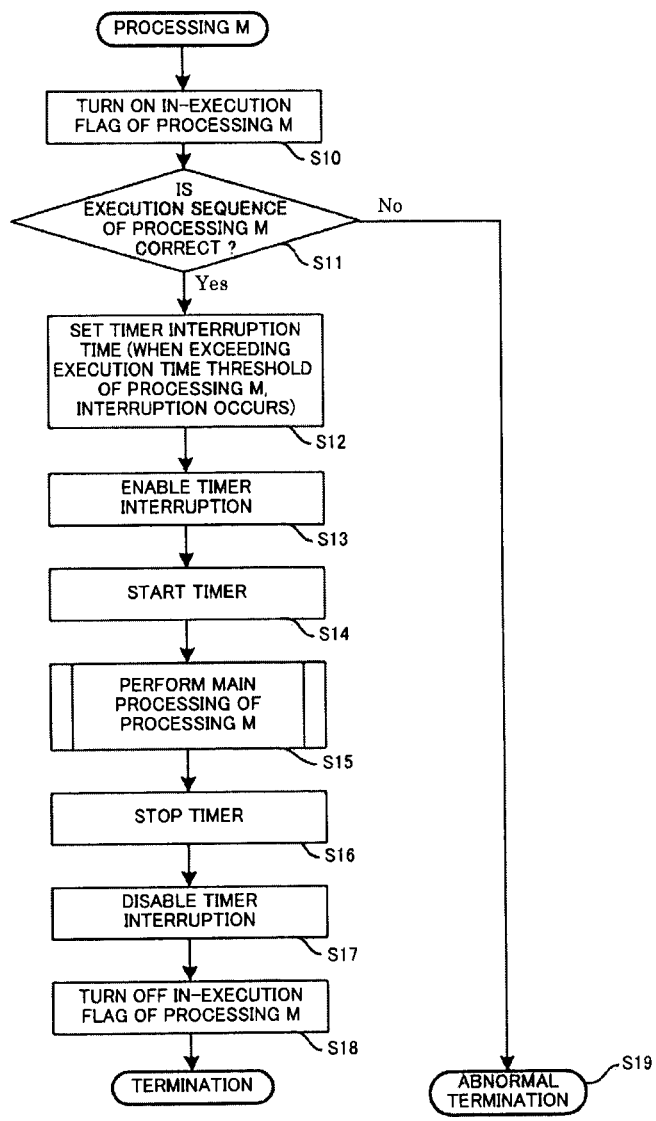
FIG. 10 is a flowchart showing the processing flow of processing M in the case that no abnormality occurs in the execution time of the normal processing (processing M) (when the execution time is normal) in the present invention.

FIG. 10 is a flowchart showing the processing flow of the processing M being a certain normal processing in the periodic processing (the processing M is any one processing of processings 1 to N) in the case that no abnormality occurs in the execution time of the said normal processing (the processing M) (when the execution time is normal) in the present invention.

As shown in FIG. 10, when the processing address of the processing M (the head address of the processing M) is read by the CPU 110, at the same time, an in-execution flag that represents the execution of the processing M is turned on (step S10), the CPU 110 judges whether the execution sequence of the processing M is correct or not (step S11), in the case of judging that the execution sequence of the processing M is correct, a timer interruption time is set (step S12). On the other hand, in the case of judging that the execution sequence of the processing M is not correct, it becomes an abnormal termination (step S19).

Here, since a necessary execution time to perform the processing is different for every normal processing, as shown in FIG. 5, respective different normal processing's execution time thresholds are preliminarily set for every normal processing, hence the above timer interruption time is determined based on the normal processing's execution time threshold corresponding to the processing M that the in-execution flag is turned on (hereinafter, also simply referred to as "the processing M's execution time threshold").

Therefore, the CPU 110 reads the processing M's execution time threshold from the ROM 130 or the RAM 140, sets the above timer interruption time based on the read processing M's execution time threshold, and subsequently, enables the timer interruption so that the interruption occurs when exceeding the processing M's execution time threshold (step S13).

Next, the CPU 110 starts counting of processing M's execution time performed by the general-purpose timer by starting the processing of the processing M and concurrently performing the start processing of the timer (step S14).

Although a main processing of the processing M (step S15) is performed by the CPU 110 while the counting of the processing M's execution time performed by the above general-purpose timer is carried out, if the main processing of the processing M performed by the CPU 110 is terminated within the timer interruption time set based on the processing M's execution time threshold, it is judged that the processing M's execution time is normal, the CPU 110 performs the stop processing of the timer during counting (step S16), turns off the in-execution flag of the processing M (step S18) after disabling the timer interruption (step S17) and terminates the processing M, based on the execution sequence shown in FIG. 4, the CPU 110 executes the next normal processing of the processing M (i.e., a processing M+1) and concurrently performs the start processing of the timer.

Next, with respect to one processing of each normal processing shown in FIG. 10 (the processing M), the flow of the timer interruption processing in the case that the execution time of the said processing (the processing M) exceeds the processing M's execution time threshold, i.e., in the case that the abnormality occurs in the execution time of the said processing (the processing M) (when the execution time is abnormal), will be described with reference to FIG. 11.

Figure 11:
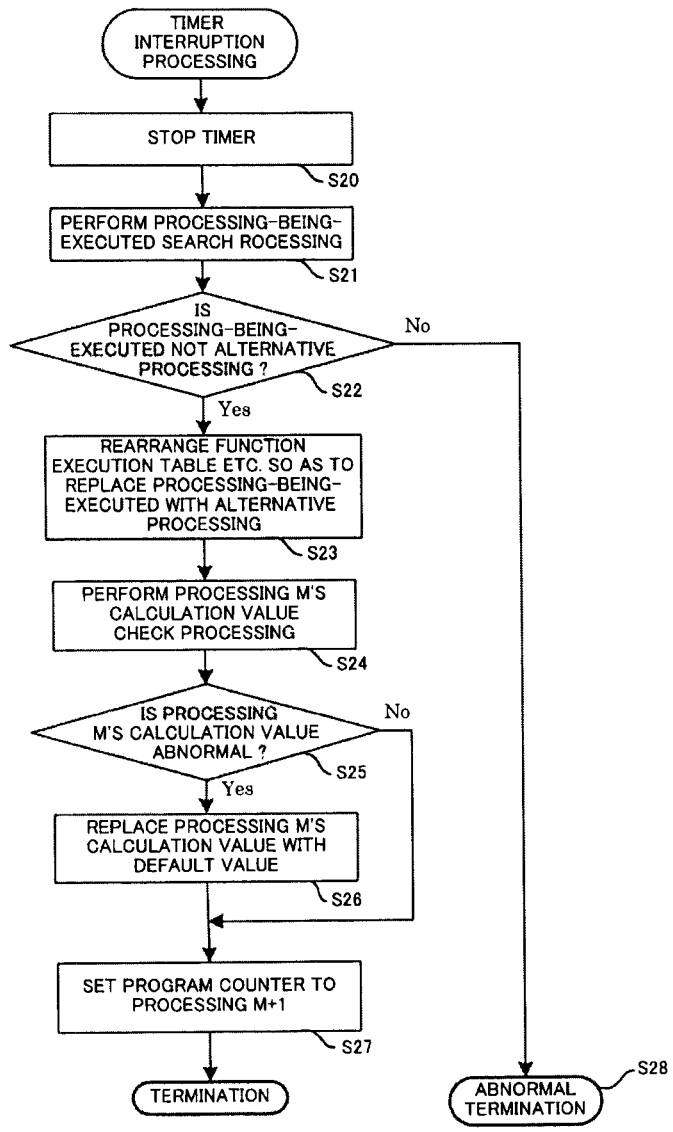
FIG. 11 is a flowchart showing the flow of a timer interruption processing in the case that an abnormality occurs in the execution time of the normal processing (when the execution time is abnormal) in the present invention.

In the case that the main processing of the processing M of FIG. 10 that is performed by the CPU 110 is not terminated within the above timer interruption time, since the stop processing of the above timer (step S16) is not performed, a time-out occurs, hence the timer interruption processing being performed when the execution time of the normal processing is abnormal that is shown in FIG. 11, is performed.

As shown in FIG. 11, in the timer interruption processing, the CPU 110 firstly performs the stop processing of the timer during counting (step S20), and then performs a processing-being-executed search processing (step S21).

The processing-being-executed search processing is a processing to read out information about that the processing-being-executed that the interruption is performed (i.e., the processing that it is judged that the execution time abnormality occurs) is a processing of what number execution sequence shown in such as FIG. 4 from the ROM 130 or the RAM 140 and concurrently, also obtain information for performing a judgment on whether the said processing (the processing-being-executed) is not an alternative processing or not.

Next, the CPU 110 performs a determination on whether the processing-being-executed that the interruption is performed is not an alternative processing or not based on the above information read (step S22). The determination performed in step S22 is to eliminate a possibility that the processing falls into an infinite loop because the same alternative processing is further performed in the case that the above processing-being-executed is an alternative processing. Therefore, in the case of determining that the processing-being-executed is an alternative processing by the determination performed in step S22, the timer interruption processing is terminated as the abnormal termination (step S28).

On the other hand, in the case of determining that the processing-being-executed is not an alternative processing, shift to the next step S23. The processing performed in step S23 is a processing that rearranges contents such as command codes and function execution tables of the CPU 110 so as to replace the processing-being-executed (the processing that it is judged that the execution time abnormality occurs) with an alternative processing corresponding to the processing-being-executed (the processing that it is judged that the execution time abnormality occurs) in the next period. In the step S23, concurrently, information such as a processing address (a head address) of the next normal processing of the processing-being-executed and a processing address (a head address) of the alternative processing are stored in the RAM 140 for later reference.

Next, a processing M's calculation value check processing is performed (step S24). The processing M's calculation value check processing is to perform a judgment on whether the calculation value of the processing M is abnormal or not (step S25), that judgment is performed depend on whether or not the calculation value of the processing M is within a predetermined threshold that is preliminarily set and so on. Then, in the case of judging that there is an abnormality in the calculation value of the processing M, the calculation value of the processing M is replaced with a default value (step S26), and on the other hand, in the case of judging that there is no abnormality in the calculation value of the processing M, shift to step S27.

Next, the step S27 sets a program counter of the CPU 110 to head of the processing M+1 and terminates the timer interruption processing.

Figure 12:
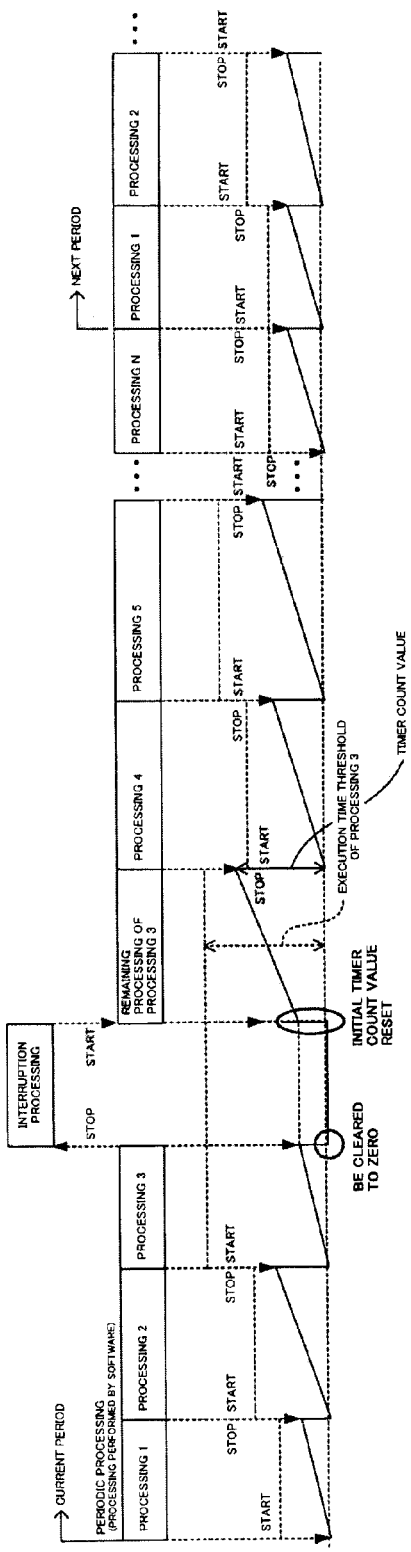
FIG. 12 is a diagram for explaining a periodic processing when the execution time of the normal processing is normal (in the case that an interruption processing is performed during processing M) in the present invention.
Figure 13:
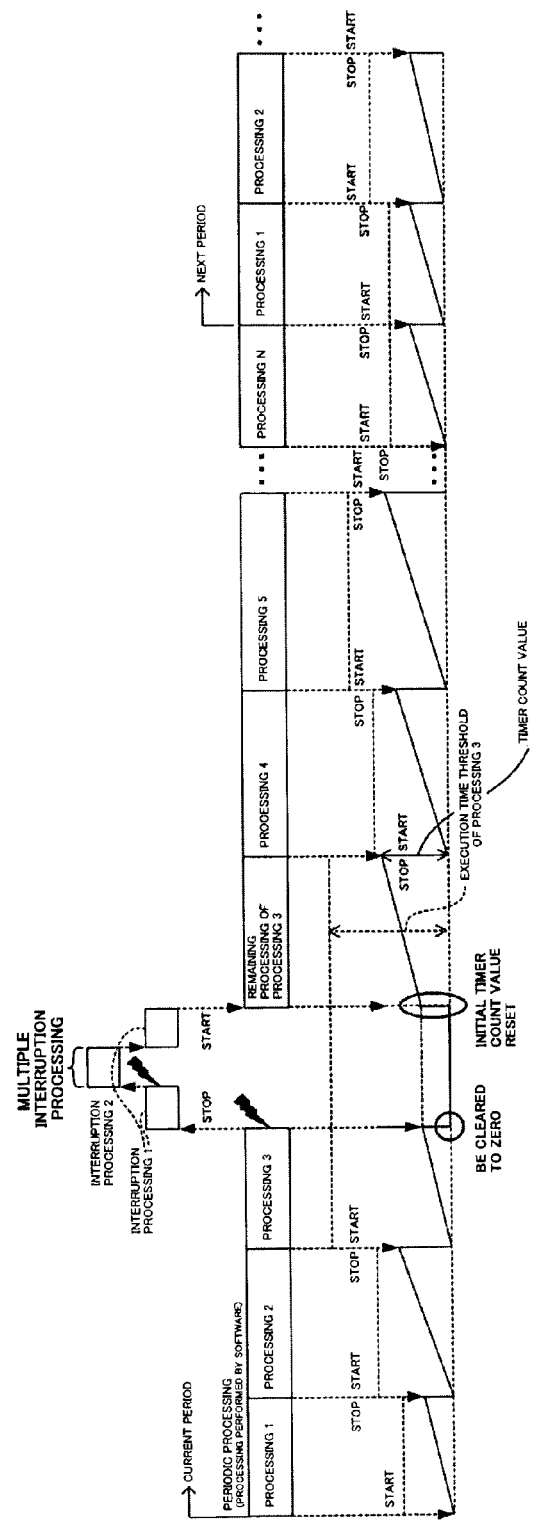
FIG. 13 is a diagram for explaining a periodic processing when the execution time of the normal processing is normal (in the case that a multiple interruption processing is performed during processing M) in the present invention.

Next, two application examples of the measurement method for measuring the execution time of the processing M in the present invention will be described with reference to FIG. 12 and FIG. 13. In the periodic processing conceptually shown in FIG. 8 and FIG. 9, it is not considered that an interruption processing ("the interruption processing" referred to here is not "the comparison match interruption" for abnormal time monitoring of the normal processing of the present invention and is an interruption processing as a normal processing which performs the control of the electric power steering apparatus, obtaining sensor values or the like.) is performed during a certain normal processing (the processing M). Since the interruption processing is commonly used in software processings performed by an ordinary built-in MCU, methods capable of correctly measuring the execution time of the processing M even in the case that the interruption processing is performed, are conceptually shown in FIG. 12 and FIG. 13. FIG. 12 is an example in the case that the interruption processing is performed during the execution of the processing 3 being a normal processing, and FIG. 13 is an example in the case that the multiple interruption processing is performed during the execution of the processing 3 being a normal processing.

Further, "the comparison match interruption" for abnormal time monitoring of the normal processing referred to in the present invention, is an interruption performed by the timer interruption processing when the execution time is abnormal shown in FIG. 9.

FIG. 12 shows an application example 1 and conceptually shows the periodic processing when the execution time of the normal processing is normal (in the case that the interruption processing is performed during the execution of the processing 3).

As shown in FIG. 12, the timer is once stopped at the beginning of the interruption processing. And then, when going through the interruption, the timer is started once again. Since when the timer in most of built-in MCUs is stopped, concurrently the timer count value is cleared to zero, hence at the time of restarting, a timer count value immediately before stopping is stored, and the timer measurement is started from the stored timer count value. Thus, it becomes possible to correctly measure the execution time (the processing time) of the processing 3 itself except the time of the interruption.

Further, since the timer built in most built-in MCU has a system (i.e., a timer count value's initial value preset function) capable of presetting an initial value of the timer count value (where does the counting start from), in the present invention, by using this system, when the timer is started once again after going through the interruption, it is possible to set the initial value of the timer count value to the stored timer count value. Furthermore, in the case that there is no timer count value's initial value preset function in the timer built in the MCU 31, when the interruption occurs, immediately before the timer count value is stored and the interruption is terminated, it is also possible to subtract the stored timer count value from a timer count's threshold (the normal processing's execution time threshold set in the timer) and set the result of subtraction as a new timer count's threshold and execution time postponement of remaining processing of the processing 3.

In the application example 1 shown in FIG. 12, although the interruption is considered, a multiple interruption is not considered. FIG. 13 shows an application example 2 and conceptually shows the periodic processing when the execution time of the normal processing is normal (in the case that the multiple interruption processing is performed during the execution of the processing 3).

As shown in FIG. 13, in the case that the multiple interruption processing (i.e., an interruption processing 2) is performed, the stop processing and the start processing of the timer are not performed. In FIG. 13, there is a flow that the multiple interruption processing (i.e., the interruption processing 2) interrupts during the execution of the interruption processing (i.e., during the execution of an interruption processing 1), the multiple interruption processing (i.e., the interruption processing 2) is terminated after it is executed, and remaining interruption processing 1 is executed after returning to the interruption processing 1. It is judged by reading flag variables and register values of the microcomputer and the CPU that whether during the multiple interruption processing or not. As shown in FIG. 13, the timer is stopped at the time of transiting from the normal processing (the processing 3) to the interruption processing (i.e., the interruption processing 1), and the timer is restarted immediately before shifting from the interruption processing (i.e., the interruption processing 1) to the normal processing (the processing 3).

Figure 14:
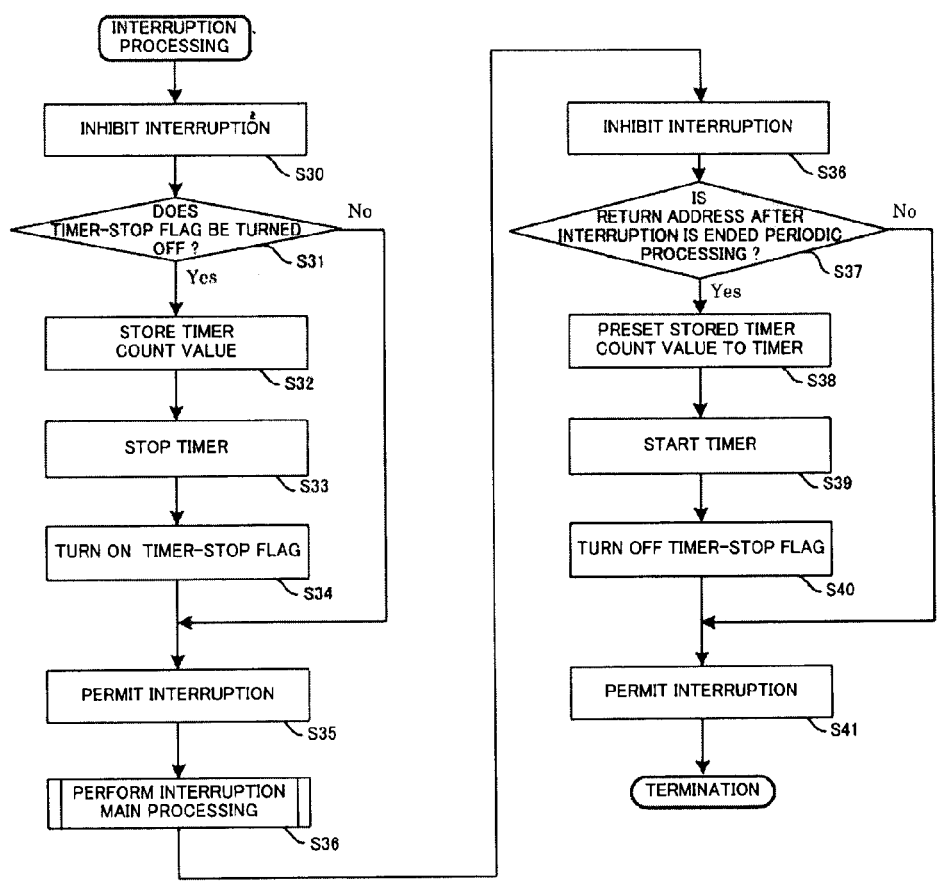
FIG. 14 is a flowchart of the interruption processing which is performed during processing M in FIG. 12 and FIG. 13.

FIG. 14 shows the flow of the interruption processing (an ordinary interruption processing) performed during the processing 3 that corresponds to the application example 1 of FIG. 12 and the application example 2 of FIG. 13.

As shown in FIG. 14, when the ordinary interruption processing occurs, the interruption is inhibited (step S30), it is judged that whether a timer-stop flag is turned off or not (step S31), in the case that the timer-stop flag is turned off, the timer count value is stored (step S32), the timer is stopped (step S33), the timer-stop flag is turned on (step S34), the interruption is permitted (step S35), an interruption main processing is performed (step S36), next, the interruption is inhibited (step S36), it is judged that whether a return address after the interruption ends is the periodic processing (the normal processing) or not (step S37), in the case of judging that the return address after the interruption ends is the periodic processing (the normal processing), the stored timer count value is preset in the timer (step S38), the timer is started (step S39), the timer-stop flag is turned off (step S40), the interruption is permitted (step S41), and the ordinary interruption processing ends.

On the other hand, in the step S31, in the case that the timer-stop flag is not turned off (i.e., in the case that the timer-stop flag is turned on), shift to the step S35. Further, in the step S37, in the case of judging that the return address after the interruption ends is not the periodic processing (the normal processing), shift to the step S41.

As mentioned above, in the present invention, by performing the execution time monitoring of the normal processing (for example, the processing M) obtained by subdividing the control program of the electric power steering apparatus by using the timer interruption processing based on the general-purpose timer built in the MCU 31 and software, in the case that the execution time of the said processing M exceeds the processing M's execution time threshold, i.e., in the case of judging that the abnormality occurs in the execution state of the processing M since the execution time abnormality of the processing M is detected, it is possible to continue the control of the electric power steering apparatus (the steering assist by the electric power steering apparatus) without stopping the control of the electric power steering apparatus even in the case that there is a normal processing's execution time abnormality which occurs in a case that the normal processing itself is not terminated due to increase in the processing load or falling into the infinite loop by performing the preliminarily-prepared alternative processing corresponding to the processing M (the alternative processing for processing M) in the next period as a substitute for the processing M having the execution state abnormality.

Further, as mentioned above, in the present invention, since the execution time monitoring of the normal processing obtained by subdividing the control program of the electric power steering apparatus is performed by using the timer interruption processing based on the general-purpose timer built in the MCU 31 and software and the timer interruption time is set based on the execution time threshold of the above normal processing, according to the present invention, it is possible to immediately perform the abnormality detecting of the execution time (the execution state) of the normal processing even in the case that the normal processing itself is not terminated due to the infinite loop or the like.

In this way, according to the control apparatus and the control method of on-vehicle electronic equipment of the present invention, the execution state (the execution time) of the control program of the on-vehicle electronic equipment such as an electric power steering apparatus is monitored by a shorter time unit than the conventional abnormality monitoring using a watchdog timer (i.e., by the execution time threshold unit of the normal processing obtained by subdividing the control program of the on-vehicle electronic equipment), and in the case that the execution state (the execution time) abnormality of a normal processing obtained by subdividing the control program is detected, it is possible to continue the control of the on-vehicle electronic equipment without stopping the control of the on-vehicle electronic equipment by performing the alternative processing corresponding to the said normal processing in the next period.

Therefore, for example, in the case that the control apparatus and the control method of on-vehicle electronic equipment of the present invention is used in the control of the electric power steering apparatus, even in the case of judging that an abnormality occurs in the control apparatus of the electric power steering apparatus, it becomes possible to continuously perform the steering assist by the electric power steering apparatus, and it is also possible to realize the comfortable steering performance without giving excessive burdens to the driver.

EXPLANATION OF REFERENCE NUMERALS

1 steering wheel
2 column shaft (steering shaft, handle shaft)

3 reduction gears
4a, 4b universal joint
5 rack and pinion mechanism
6a, 6b tie rod
7a, 7b hub unit
8L, 8R steered wheel
10 torque sensor
11 ignition key
12 vehicle speed sensor
13 battery
14 steering angle sensor
20 motor
30 control unit (ECU)
31 micro control unit (MCU)
33 relay
35 motor driving circuit
37 motor current detecting circuit
39 steering angle detecting circuit
110 CPU
120 timer (general-purpose timer)
130 ROM
140 RAM
150 ADC
160 GPIO
170 peripherals

The invention claimed is:

1. A control apparatus of an electric power steering apparatus, comprising:
   a micro control unit (MCU) provided in said control apparatus and configured to:
   monitor an execution time of each normal processing obtained by subdividing a control program of said electric power steering apparatus;
   set execution time thresholds for execution time monitoring respectively with respect to said each normal processing;
   set execution time thresholds for execution time monitoring respectively with respect to each alternative processing to be paired with said each normal processing;
   measure said execution time of said normal processing by means of a general-purpose timer built in said MCU and by starting said general-purpose timer at a beginning of said normal processing, and stopping said general-purpose timer at an end of said normal processing and concurrently clearing a timer count value to zero;
   in a case that an ordinary interruption processing as an ordinary processing relating to a control of said electric power steering apparatus is performed during execution of said normal processing, stop said general-purpose timer once at a beginning of said ordinary interruption processing and concurrently store a timer count value immediately before stopping, and then, after going through an interruption based on said ordinary interruption processing, restart said general-purpose timer and concurrently perform timer measurement from said stored timer count value; and
   at a time when said execution time measured by said general-purpose timer reaches an execution time threshold of said normal processing, in a case that said normal processing is not terminated yet, judge that an execution time abnormality of said normal processing occurs and concurrently regard said normal processing as abnormality, in a current period, stop said normal processing by performing a timer interruption processing being a software processing performed by said MCU, perform a check processing of a calculation value of said normal processing, in a case that said calculation value is abnormal, replace said calculation value with a default value, after going through a timer interruption based on said general-purpose timer, perform a next normal processing based on an execution sequence, in a next period, continue said control of said electric power steering apparatus by performing an alternative processing to be paired with said normal processing as a substitute for said normal processing based on an execution sequence of said normal processing.

2. The control apparatus of the electric power steering apparatus according to claim 1, wherein said MCU performs monitoring of said execution time of said normal processing by using said general-purpose timer and said timer interruption and sets a timer interruption time based on said execution time threshold of said normal processing.

3. A control method of an electric power steering apparatus, comprising steps of:
   monitoring an execution time of each normal processing obtained by subdividing a control program of said electric power steering apparatus by means of a micro control unit (MCU) which is provided in a control apparatus of said electric power steering apparatus;
   setting execution time thresholds for execution time monitoring respectively with respect to said each normal processing;
   setting execution time thresholds for execution time monitoring respectively with respect to each alternative processing to be paired with said each normal processing;
   measuring said execution time of said normal processing by means of a general-purpose timer built in said MCU and by starting said general-purpose timer at a beginning of said normal processing, and stopping said general-purpose timer at an end of said normal processing and concurrently clearing a timer count value to zero;
   in a case that an ordinary interruption processing as an ordinary processing relating to a control of said electric power steering apparatus is performed during execution of said normal processing, stopping said general-purpose timer once at a beginning of said ordinary interruption processing and concurrently storing a timer count value immediately before stopping, and then, after going through an interruption based on said ordinary interruption processing, restarting said general-purpose timer and concurrently performing timer measurement from said stored timer count value; and
   at a time when said execution time measured by said general-purpose timer reaches an execution time threshold of said normal processing, in a case that said normal processing is not terminated yet, judging that an execution time abnormality of said normal processing occurs and concurrently regarding said normal processing as abnormality, in a current period, stopping said normal processing by performing a timer interruption processing being a software processing performed by said MCU, performing a check processing of a calculation value of said normal processing, in a case that said calculation value is abnormal, replacing said calculation value with a default value, after going through a timer interruption based on said general-purpose timer, performing a next normal processing based on an execution sequence, in a next period, continuing said control of said electric power steering apparatus by performing an alternative processing to be paired with said normal processing as a substitute for said normal processing based on an execution sequence of said normal processing.

4. The control method of the electric power steering apparatus according to claim 3, wherein said MCU performs monitoring of said execution time of said normal processing by using said general-purpose timer and said timer interruption and sets a timer interruption time based on said execution time threshold of said normal processing.

* * * * *